United States Patent
Tamura

(10) Patent No.: US 8,281,124 B2
(45) Date of Patent: Oct. 2, 2012

(54) NETWORK APPARATUS, IPSEC SETTING METHOD THEREIN, AND COMPUTER-READABLE RECORDING MEDIUM STORING A CONTROL PROGRAM FOR EXECUTING THE METHOD

(75) Inventor: Hiroshi Tamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1346 days.

(21) Appl. No.: 11/684,709

(22) Filed: Mar. 12, 2007

(65) Prior Publication Data

US 2007/0220250 A1 Sep. 20, 2007

(30) Foreign Application Priority Data

Mar. 14, 2006 (JP) ................... 2006-069766

(51) Int. Cl.
*H04L 29/06* (2006.01)
*G06F 7/04* (2006.01)
*G06F 15/16* (2006.01)
*G06F 17/30* (2006.01)

(52) U.S. Cl. ............... 713/153; 713/154; 726/1; 726/3; 726/11; 726/14; 380/247; 380/248; 380/270

(58) Field of Classification Search .............. 713/153, 713/154; 726/1, 3, 11, 14; 380/247, 248, 380/270
See application file for complete search history.

(56) References Cited

U.S. PATENT DOCUMENTS

| | | | | |
|---|---|---|---|---|
| 5,940,591 A * | 8/1999 | Boyle et al. | ...................... | 726/3 |
| 6,834,298 B1 * | 12/2004 | Singer et al. | ................... | 709/220 |
| 6,931,529 B2 * | 8/2005 | Kunzinger | ................... | 713/153 |
| 7,191,331 B2 * | 3/2007 | Maufer et al. | ................ | 713/153 |
| 7,512,138 B2 * | 3/2009 | Horoschak et al. | ........... | 370/401 |
| 7,631,181 B2 * | 12/2009 | Hirata et al. | ................... | 713/151 |
| 2002/0029288 A1 * | 3/2002 | Dobbins et al. | ............... | 709/238 |
| 2003/0061507 A1 * | 3/2003 | Xiong et al. | ................... | 713/201 |
| 2004/0006641 A1 * | 1/2004 | Abrol et al. | ................... | 709/245 |
| 2004/0093524 A1 * | 5/2004 | Sakai | ............................ | 713/201 |
| 2005/0015590 A1 | 1/2005 | Tamura | | |
| 2005/0273595 A1 * | 12/2005 | Ogawa et al. | ................ | 713/153 |
| 2006/0200855 A1 * | 9/2006 | Willis | ................................ | 726/2 |
| 2007/0016945 A1 * | 1/2007 | Bassett et al. | .................. | 726/11 |
| 2007/0130457 A1 * | 6/2007 | Kamat et al. | .................. | 713/151 |

FOREIGN PATENT DOCUMENTS

| | | |
|---|---|---|
| JP | 2005-184594 | 7/2005 |
| JP | 2006-101344 | 4/2006 |
| JP | 2006-121618 | 5/2006 |

* cited by examiner

*Primary Examiner* — Edan Orgad
*Assistant Examiner* — Kari Schmidt
(74) *Attorney, Agent, or Firm* — Oblon, Spivak, McClelland, Maier & Neustadt, L.L.P.

(57) ABSTRACT

A network apparatus which is connected to a network is disclosed. The network apparatus includes a managing unit which manages an address range in which addresses to be allocated to a destination network apparatus are registered and encryption parameters for encrypting data to be transmitted to the destination network apparatus so that the address range and the encryption parameters are related to each other, an address generating unit which generates an address for the destination network apparatus by selecting an address in the address range, and an encryption unit which encrypts the data to be transmitted to the address generated by the address generating unit based on the encryption parameters.

15 Claims, 16 Drawing Sheets

| | COMBINATION OF PARAMETERS | IP ADDRESS TO BE ALLOCATED TO DESTINATION |
|---|---|---|
| 1 | C1 | 2345:12::2:1234:5678:10/112 |
| 2 | C2 | 2345:12::2:1234:5678:11/112 |
| 3 | C3 | 2345:12::2:1234:5678:12/112 |
| 4 | C4 | 2345:12::2:1234:5678:13/112 |
| 5 | C5 | 2345:12::2:1234:5678:14/112 |
| 6 | C6 | 2345:12::2:1234:5678:15/112 |
| 7 | C7 | 2345:12::2:1234:5678:16/112 |
| 8 | C8 | 2345:12::2:1234:5678:17/112 |

| | COMBINATION OF PARAMETERS | USER INFORMATION | IP ADDRESS TO BE ALLOCATED TO DESTINATION |
|---|---|---|---|
| 1 | C1 | Group-A | 2369::120:1234:5678:abcd/112 |
| 2 | C2 | apple | 100.200.148/24 |
| 3 | C1 | Group-B | 2369::120:1234:5678:12ab/112 |
| 4 | C2 | orange | 100.200.149/24 |
| 5 | C3 | Laboratory | FE80::1234/80 |
| 6 | C3 | Designing Section | FE80::1235/80 |

FIG.9

| | COMBINATION OF PARAMETERS | GLOBAL ADDRESS OR LOCAL ADDRESS | IP ADDRESS TO BE ALLOCATED TO DESTINATION |
|---|---|---|---|
| 1 | C4 | Global | 123.222.44/24 |
| 2 | C4 | Local | 192.168.20/24 |

T5

| SECURITY LEVEL | PROTOCOL | ENCAPSULATION MODE | REQUEST LEVEL | HASH ALGORITHM PARAMETER | AUTHENTICATION ALGORITHM PARAMETER | ENCRYPTION ALGORITHM PARAMETER |
|---|---|---|---|---|---|---|
| High | ESP | Transport | Require | SHA1 | HMAC-SHA1 | AES |
| Middle | ESP | Transport | Use | MD5 | HMAC-SHA1/HMAC-MD5 | 3DES |
| Low | AH | Transport | Use | MD5 | HMAC-SHA1/HMAC-MD5 | DES |

| SECURITY LEVEL | IP ADDRESS TO BE ALLOCATED TO DESTINATION |
|---|---|
| High | 2369::120:1234:5678:abcd/112 |
| Middle | 2369::120:1234:5678:12cf/112 |
| Low | 2369::120:1234:5678:12ab/112 |

NETWORK APPARATUS, IPSEC SETTING METHOD THEREIN, AND COMPUTER-READABLE RECORDING MEDIUM STORING A CONTROL PROGRAM FOR EXECUTING THE METHOD

BACKGROUND OF THE INVENTION

1. Field of the Invention

The present invention generally relates to a network apparatus capable of easily setting IPsec (security architecture for Internet Protocol), an IPsec setting method therein, and a computer-readable recording medium storing a control program for executing the method.

2. Description of the Related Art

Maintaining security in network apparatuses which are connected to a network has been required under a high quest of security. The network apparatus is, for example, a printer, a scanner, a facsimile, or an MFP (multifunctional peripheral) having the above functions.

In IPsec, data are encrypted in the IP layer. That is, different from SSL (secure socket protocol) which has been frequently used in WWW data encryption, IPsec does not need to adjust a program of an application layer so as to maintain security.

[Patent Document 1] Japanese Laid-Open Patent Application No. 2005-184594

As described above, IPsec has an advantage; however, in IPsec, a user must set many items and this presents complexity to the user. In addition, communications can be executed between network apparatuses having the same settings in their IPset. When one of the network apparatuses has a setting made in error, the communications cannot be executed therebetween.

In Patent Document 1, an address generating method is disclosed so as to easily manage data in a large scale network. However, IPset is not described.

SUMMARY OF THE INVENTION

In a preferred embodiment of the present invention, there is provided a network apparatus capable of easily setting IPsec, an IPsec setting method therein, and a computer-readable recording medium storing a control program for executing the method.

Features and advantages of the present invention are set forth in the description that follows, and in part will become apparent from the description and the accompanying drawings, or may be learned by practice of the invention according to the teachings provided in the description. Features and advantages of the present invention will be realized and attained by a network apparatus, an IPsec setting method therein, and a computer-readable recording medium storing a control program for executing the method particularly pointed out in the specification in such full, clear, concise, and exact terms as to enable a person having ordinary skill in the art to practice the invention.

To achieve one or more of these and other advantages, according to one aspect of the present invention, there is provided a network apparatus which is connected to a network. The network apparatus includes a managing unit which manages an address range in which addresses to be allocated to a destination network apparatus are registered and encryption parameters for encrypting data to be transmitted to the destination network apparatus so that the address range and the encryption parameters are related to each other, an address generating unit which generates an address for the destination network apparatus by selecting an address in the address range, and an encryption unit which encrypts the data to be transmitted to the address generated by the address generating unit based on the encryption parameters.

According to another aspect of the present invention, there is provided an IPsec setting method in a network apparatus which is connected to a network. The IPsec setting method includes the steps of managing an address range in which addresses to be allocated to a destination network apparatus are registered and encryption parameters for encrypting data to be transmitted to the destination network apparatus so that the address range and the encryption parameters are related to each other, generating an address for the destination network apparatus by selecting an address in the address range, and encrypting the data to be transmitted to the generated address based on the encryption parameters.

According to another aspect of the present invention, there is provided a computer-readable recording medium storing a control program for executing an IPsec setting method. The control program includes the steps of managing an address range in which addresses to be allocated to a destination network apparatus are registered and encryption parameters for encrypting data to be transmitted to the destination network apparatus so that the address range and the encryption parameters are related to each other, generating an address for the destination network apparatus by selecting an address in the address range, and encrypting the data to be transmitted to the generated address based on the encryption parameters.

Effect of the Invention

According to an embodiment of the present invention, a network apparatus which can easily set IPsec is realized.

BRIEF DESCRIPTION OF THE DRAWINGS

Features and advantages of the present invention will become more apparent from the following detailed description when read in conjunction with the accompanying drawings, in which:

FIG. 7 is a second IP address range table;

FIG. 8 is a third IP address range table;

FIG. 9 is a fourth IP address range table;

FIG. 11 is a fifth IP address range table;

DESCRIPTION OF THE PREFERRED EMBODIMENT

Best Mode of Carrying Out the Invention

The best mode of carrying out the present invention is described with reference to the accompanying drawings.

Figure 1:
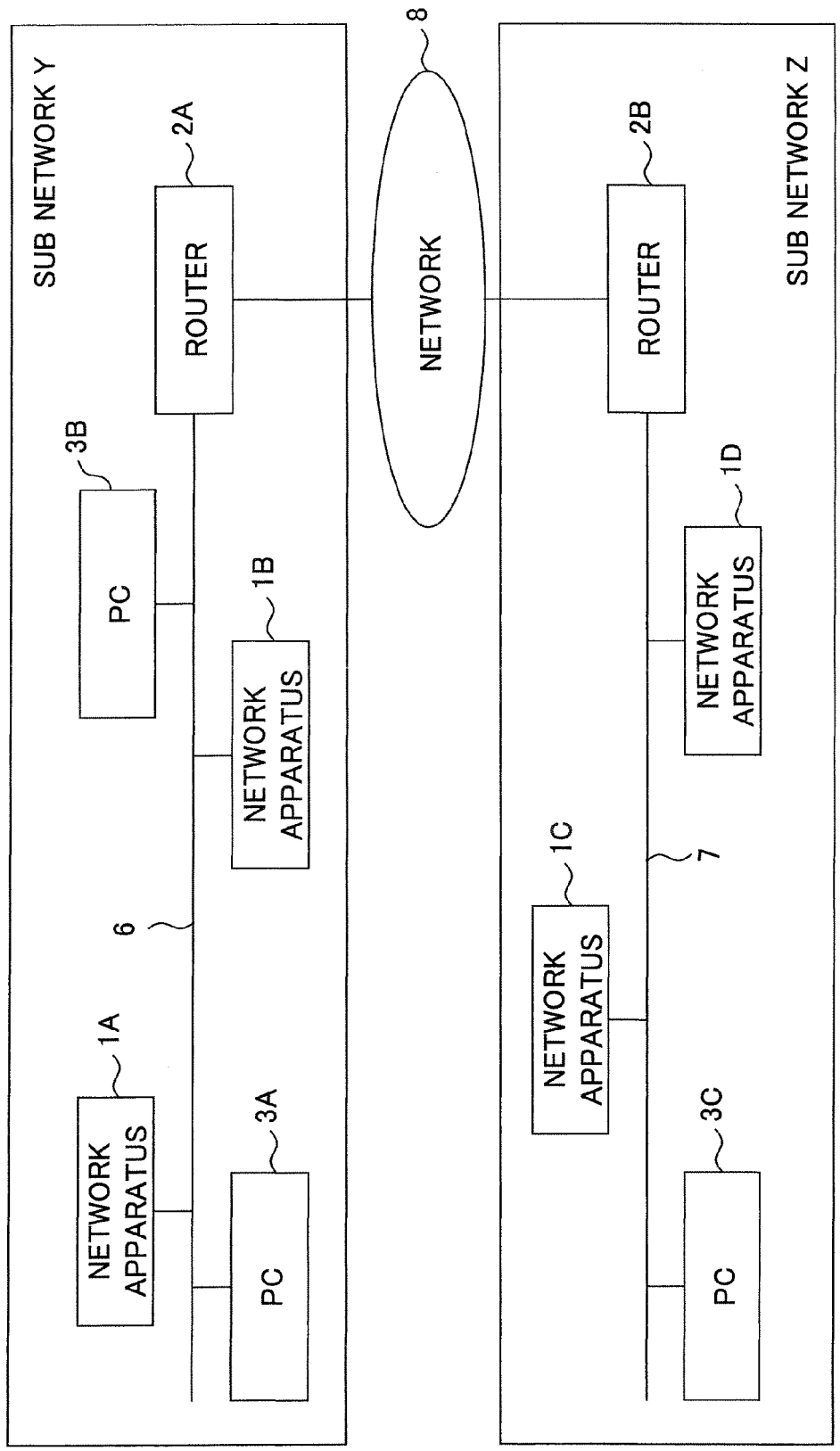
FIG. 1 is a block diagram showing a network system having network apparatuses of an embodiment of the present invention.

FIG. 1 is a block diagram showing a network system having network apparatuses of an embodiment of the present invention.

In FIG. 1, a sub network Y is connected to a sub network Z via a network 8 by corresponding routers 2A and 2B. In the sub network Y, network apparatuses 1A and 1B of the present embodiment and PCs (personal computers) 3A and 3B are connected to the router 2A via a network 6. In the sub network Z, network apparatuses 1C and 1D of the present embodiment and a PC 3C are connected to the router 2B via a network 7. IPsec communications are executed in the respective sub networks Y and Z, and are executed between the sub networks Y and Z.

Figure 2:
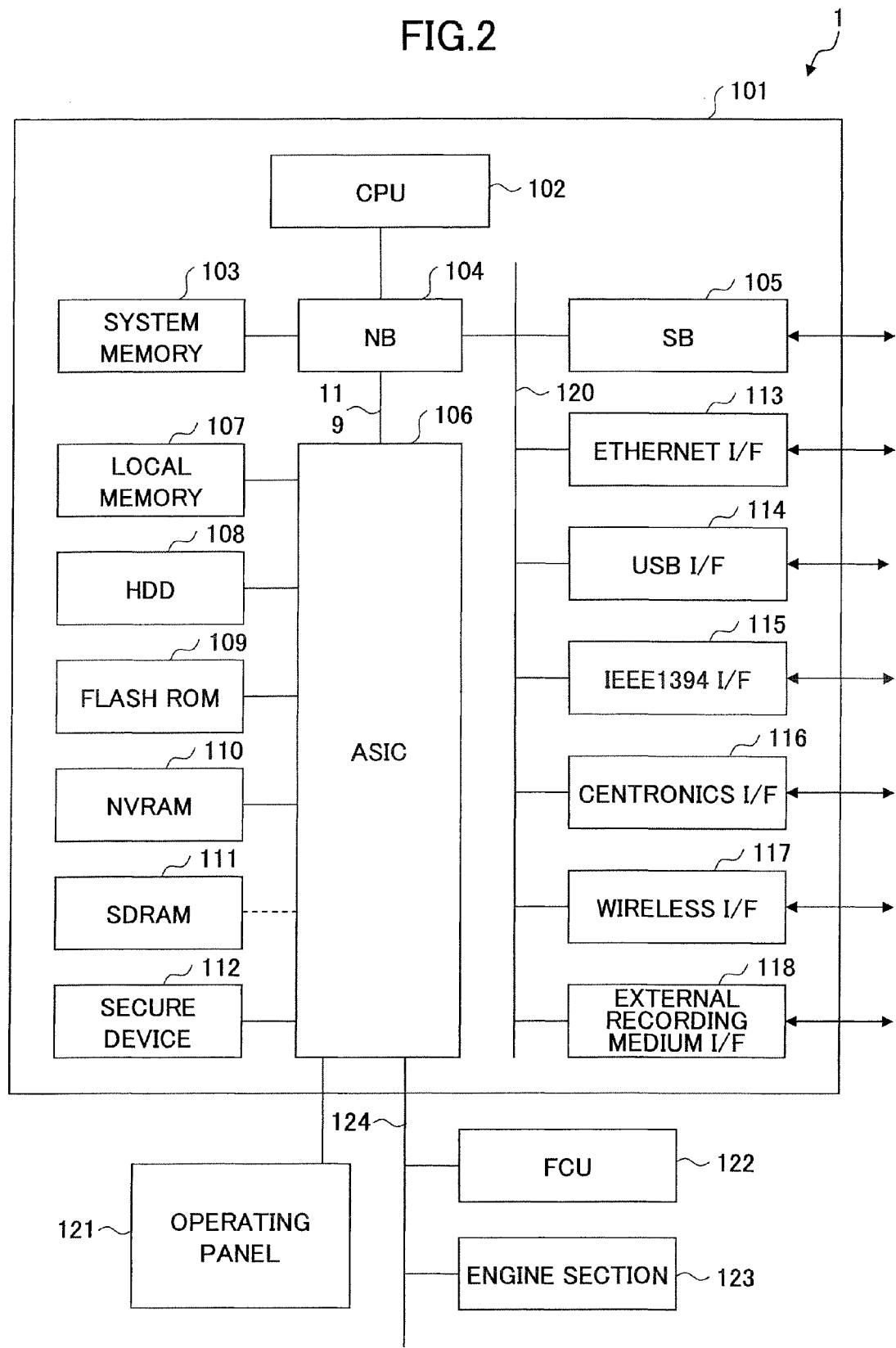
FIG. 2 is a block diagram showing the network apparatus shown in FIG. 1.

FIG. 2 is a block diagram showing a network apparatus 1 according to the embodiment of the present invention. The network apparatus 1 represents the network apparatuses 1A through 1D shown in FIG. 1. In addition, as the network apparatus 1, an image processing apparatus is used.

As shown in FIG. 2, the network apparatus 1 includes a controller 101, an operating panel 121, a FCU (facsimile control unit) 122, and an engine section 123.

The controller 101 includes a CPU 102, a system memory 103, an NB (north bridge) 104, an SB (south bridge) 105, an ASIC (application specific integrated circuit) 106, a local memory 107, an HDD (hard disk drive) 108, a flash ROM 109, an NVRAM (non-volatile RAM) 110, an SDRAM (synchronous dynamic RAM) 111, a secure device 112, an Ethernet I/F 113, a USB I/F 114, an IEEE 1394 I/F 115, a Centronics I/F 116, a wireless I/F 117, and an external recording medium I/F 118.

The operating panel 121 is connected to the ASIC 106 of the controller 101. The FCU 122 and the engine section 123 are connected to the ASIC 106 of the controller 101 via a network 124.

In the controller 101, the local memory 107, the HDD 108, the flash ROM 109, the NVRAM 110, the SDRAM 111, and the secure device 112 are connected to the ASIC 106. The CPU 102 is connected to the ASIC 106 via the NB 104. Even if the interface of the CPU 102 is unknown, the CPU 102 can be connected to the ASIC 106 via the NB 104.

The ASIC 106 is connected to the NB 104 via an AGP (accelerated graphic port) 119. In order to execute one or more processes in application software and platform software, lowering performance is prevented by the above connection via the AGP 119 instead of using a low-speed bus.

The CPU 102 controls all the elements by using software.

The CPU 102, the system memory 103, the SB 105, the ASIC 106, the Ethernet I/F 113, the USB I/F 114, the IEEE 1394 I/F 115, the Centronics I/F 116, the wireless I/F 117, and the external recording medium I/F 118 are connected via the NB 104.

The SB 105, the Ethernet I/F 113, the USB I/F 114, the IEEE 1394 I/F 115, the Centronics I/F 116, the wireless I/F 117, and the external recording medium I/F 118 are connected to the NB 104 via a bus 120. In addition, the SB 105 connects an external ROM (not shown) and an external peripheral (not shown) to the bus 120.

The system memory 103 is used as an image writing memory and so on in the image processing apparatus (the network apparatus 1). The local memory 107 is used as an image buffer and a code buffer.

The ASIC 106 is an image processing IC. The HDD 108 stores image data, document data, programs, font data, forms of data, and so on.

The network apparatus 1 may be connected to a corresponding network (not shown) via the Ethernet I/F 113, the USB I/F 114, the IEEE 1394 I/F 115, the Centronics I/F 116, or the wireless I/F 117.

The flash ROM 109 stores programs and data transmitted from external devices. The NVRAM 110 and the SDRAM 111 store data even if the power of the network device 1 is turned off.

An external recording medium can be attached to/detached from the external recording medium I/F 118. As the external recording medium, for example, an SD (secure digital) card, a compact flash card, or a ROM-DIMM (ROM-dual in-line memory module) can be used.

The secure device 112 stores key information and is not used again when the secure device 112 is once physically detached from the controller 101.

The operating panel 121 receives a user instruction and displays information for the user. The FCU 122 includes a memory and temporarily stores received facsimile data when the power of the network apparatus 1 is turned off.

In some cases, the network apparatus 1 (image processing apparatus) may not include the flash ROM 109, the SDRAM 111, the secure device 112, the USB I/F 114, the IEEE 1394 I/F 115, the Centronics I/F 116, the wireless I/F 117, the external recording medium I/F 118, and the FCU 122.

Figure 3:
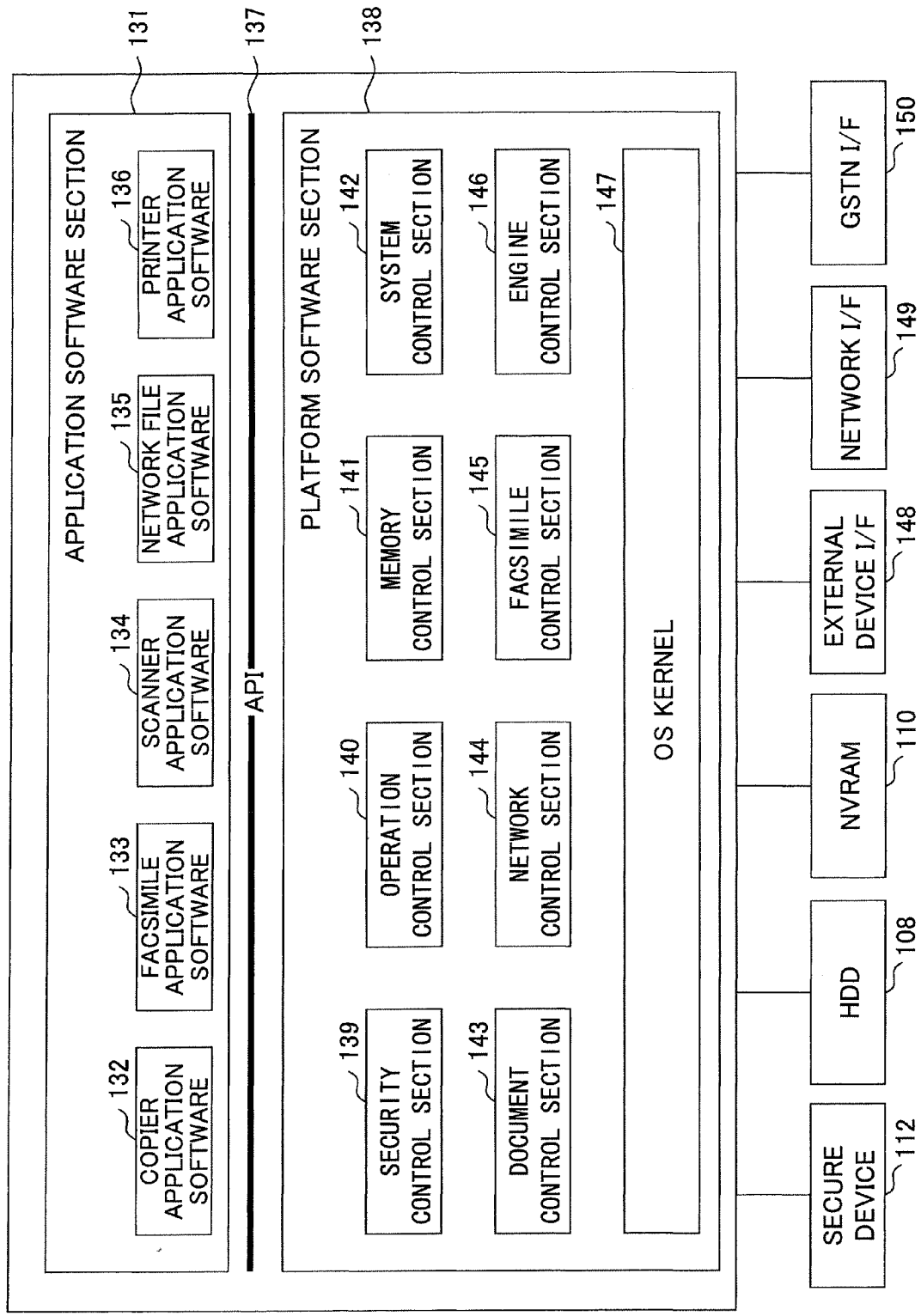
FIG. 3 is a block diagram showing software of the network apparatus shown in FIG. 1.

FIG. 3 is a block diagram showing software of the network apparatus 1.

As shown in FIG. 3, the software includes an application software section 131 and a platform software section 138.

The application software section 131 executes user service processes with respect to image forming processes such as a copying process, a facsimile process, a scanning process, and a printing process. The application software section 131 includes copier application software 132, facsimile application software 133, scanner application software 134, network file application software 135, and printer application software 136 for a page description language and a printer.

The platform software section 138 includes an OS kernel 147 and control sections which interpret a process request from the application software section 131 and generate a request to obtain resources such as hardware. That is, the platform software section 138 includes a security control section 139, an operation control section 140, a memory control section 141, a system control section 142, a document control section 143, a network control section 144, a facsimile control section 145, and an engine control section 146. The OS kernel 147 includes an IP processing section and an IPsec processing section. In addition, the platform software section 138 includes an API (application program interface) 137 which can receive a process request from the application software section 131 by using a predefined function.

The system control section 142 manages application software and hardware resources; controls the operating panel 121 to display a necessary screen and so on, and turn on an LED; and controls interrupt application software and so on.

The memory control section 141 controls a memory to obtain a memory region and execute memory release, and controls compressing image data and expanding the compressed image data.

The engine control section 146 controls the engine section 123.

The facsimile control section 145 supplies an API for executing transmission and reception of a facsimile, printing a facsimile received via a network or read from a back-up memory by being connected to a GSTN (general switched telephone network) I/F 150. In this, the networks are a PSTN (public switched telephone network), an ISDN (integrated services digital network), and so on.

The operation control section 140 controls the operating panel 121 on which a user inputs an instruction and information for the user is displayed.

The document control section 143 manages data received from an external apparatus and data to be transmitted to the external apparatus and processes the data.

The network control section 144 supplies common services to application software that needs a network I/O by being connected to a network such as Ethernet. Further, the network control section 144 controls distributing data received via the network to each application software and transmitting data from the application software to the network.

The security control section 139 controls maintaining security in the application software section 131 and the sections in the platform software section 138. For example, the security control section 139 encrypts data and decrypts encrypted data.

The CPU 102 controls all the elements in the network apparatus 1 (image processing apparatus), and executes the application software in the application software section 131 by controlling the sections in the platform software section 138.

In this, some application software in the application software section 131 and some sections in the platform software section 138 may not be included in the image processing apparatus.

In FIG. 3, an external device I/F 148 and a network I/F 149 are described below.

Figure 4:
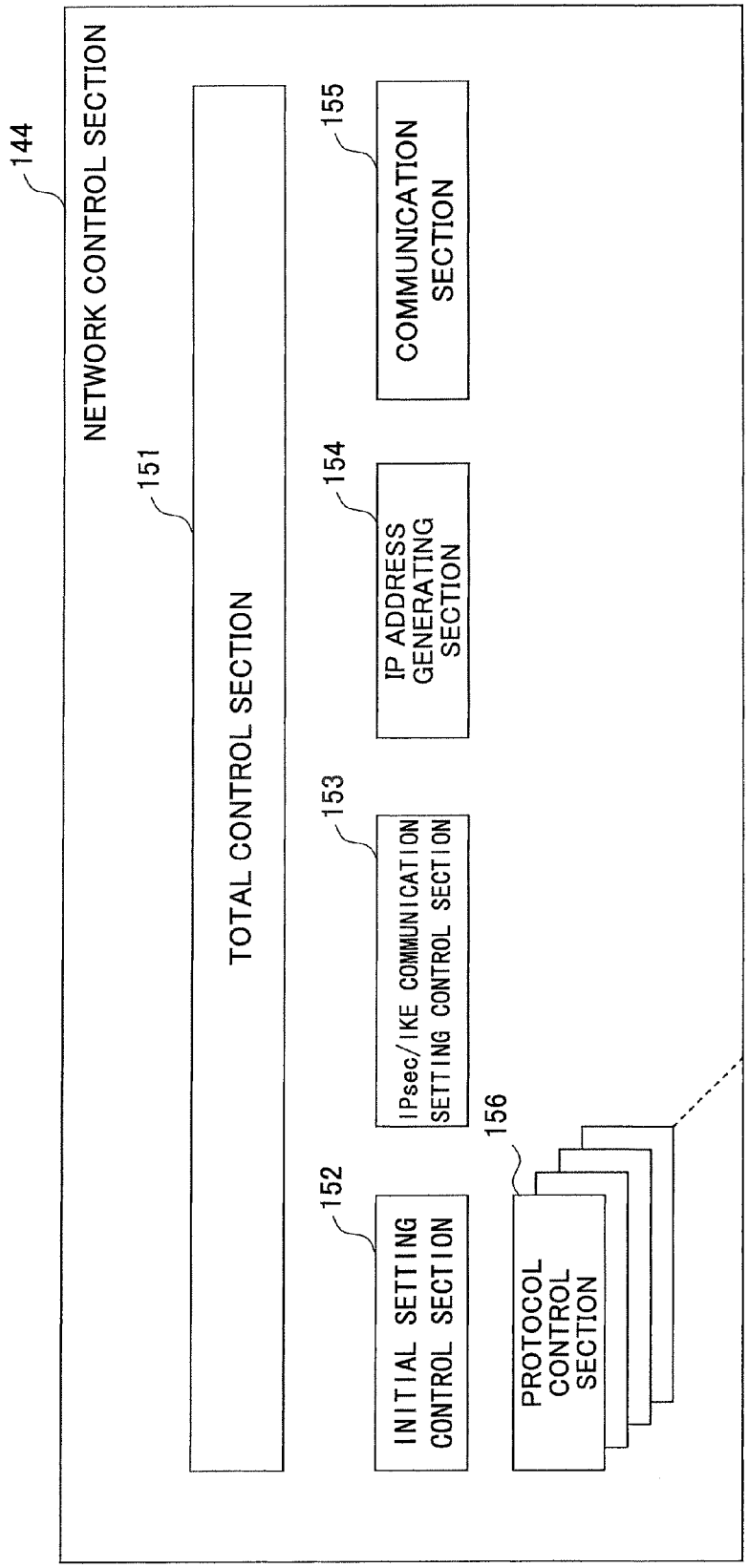
FIG. 4 is a block diagram showing a network control section shown in FIG. 3.

FIG. 4 is a block diagram showing the network control section 144.

As shown in FIG. 4, the network control section 144 includes a total control section 151, an initial setting control section 152, an IPsec/IKE (Internet Key Exchange) communication setting control section 153, an IP address generating section 154, a communication section 155, and protocol control sections 156. The total control section 151 controls all the elements in the network control section 144. The initial setting control section 152 reads initial setting information from the NVRAM 110. The communication section 155 communicates with another application software and another control section so as to exchange data and a message with the other software and the other control section. Each of the protocol control sections 156 processes a protocol, for example, HTTP (hypertext transfer protocol), FTP (file transfer protocol), Port9100, and LPR (line printer daemon protocol). The IP address generating section 154 generates an IPv4 (Internet Protocol version 4) address or an IPv6 (Internet Protocol version 6). The IPsec/IKE communication setting control section 153 controls IPsec.

The network control section 144, the security control section 139, and the OS kernel 147 apply IPsec to data.

In FIG. 4, the initial setting control section 152 and the IPsec/IKE communication setting control section 153 encrypt data.

Figure 5:
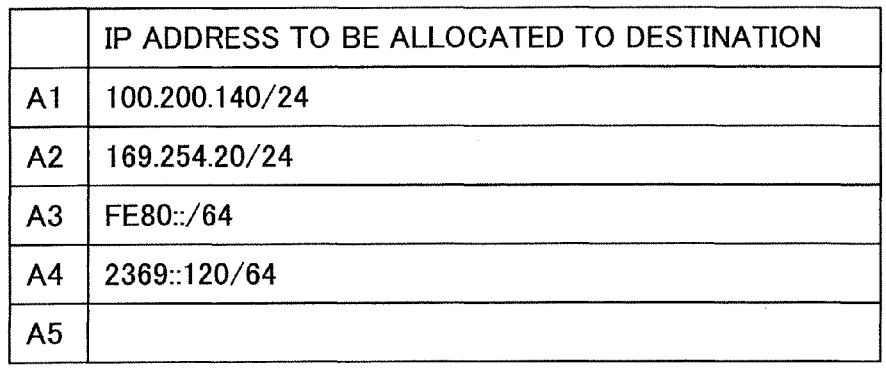
FIG. 5 is a first IP address range table.

FIG. 5 is a first IP address range table T1. In FIG. 5, IP addresses which can be allocated to a destination in the IPsec communications have been registered by a manager beforehand.

When a user selects one address from the IP address range table T1, the selected address becomes an IP address of the destination. At the same time, IPsec is set corresponding to the selected IP address and the user can transmit data to the destination having the selected IP address by IPsec communications.

The IP address range table T1 is stored in the NVRAM 110, the HDD 108, or an external device via the external device I/F 148. In the following, tables are stored in the above described memory.

Figure 6:
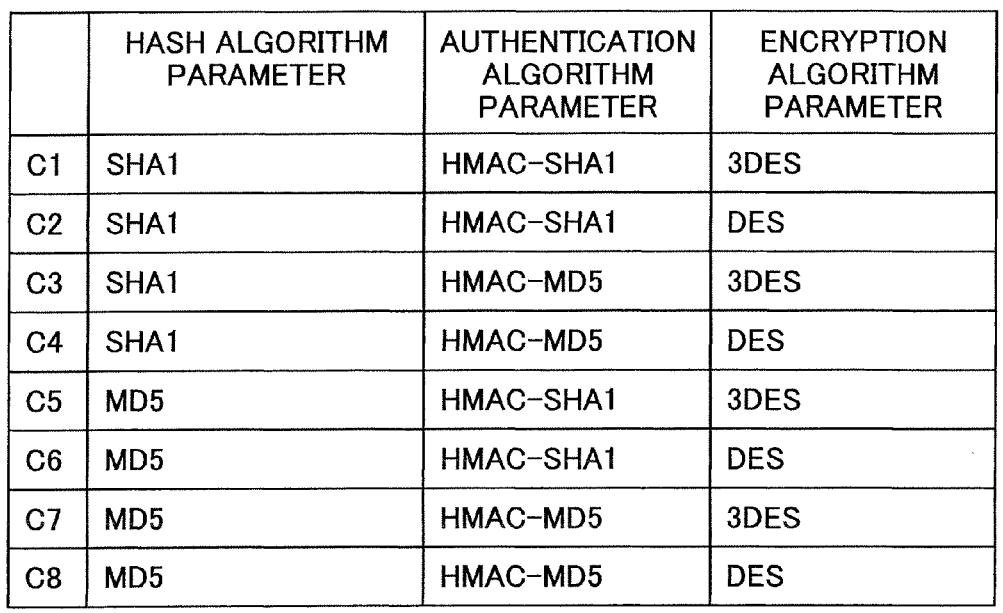
FIG. 6 is a parameter combination table in which combinations of parameters for encrypting data in IPsec are shown.

FIG. 6 is a parameter combination table T2 in which combinations of parameters for encrypting data in IPsec are shown. In FIG. 6, a hash algorithm parameter, an authentication algorithm parameter, and an encryption algorithm parameter are shown; however, IPsec parameters other than the above may be included. The parameter combination table T2 has been registered beforehand.

FIG. 7 is a second IP address range table T3. In FIG. 7, IP addresses which can be allocated to a destination in the IPsec communications have been registered with the combination of parameters shown in FIG. 6 by a manager beforehand.

When a user selects one address from the IP address range table T3, the selected address becomes an IP address of the destination. At the same time, IPsec is set corresponding to the selected IP address and the user can transmit data to the destination having the selected IP address by IPsec communications.

For example, in the network system shown in FIG. 1, the network apparatus 1A selects an IP address of a destination network apparatus, for example, the network apparatus 1D, from the first IP address range table T1 and the network apparatus 1A transmits data to the network apparatus 1D by using the selected IP address in the IPsec communications. Then, the network apparatus 1D selects an IP address of a destination (the network apparatus 1A) from a first IP address range table T1 set in the network apparatus 1D and the network apparatus 1D transmits data to the network apparatus 1A by using the selected IP address in the IPsec communications. With this, the IPsec communications can be established between the network apparatuses 1A and 1D.

FIG. 8 is a third IP address range table T4. In FIG. 8, IP addresses which can be allocated to a destination in the IPsec communications have been registered with the combination of parameters shown in FIG. 6 along with user information by a manager beforehand.

When a user selects one address from the IP address range table T4, the selected address becomes an IP address of a destination. At the same time, IPsec is set corresponding to the selected IP address and the user can transmit data to the destination having the selected IP address by IPsec communications.

In FIG. 8, the IP addresses to be allocated to a destination are registered by the combination of parameters and the user information. However, the following order can be used. That is, first, the user information is registered, next, the combination of parameters is registered, then, the IP addresses to be allocated to a destination are registered.

FIG. 9 is a fourth IP address range table T5. In FIG. 9, IP addresses which can be allocated to a destination in the IPsec communications have been registered with the combination of parameters shown in FIG. 6 and a selection of a global address or a local address by a manager beforehand.

When a user selects one address from the IP address range table T5, the selected address becomes an IP address of a destination. At the same time, IPsec is set corresponding to the selected IP address and the user can transmit data to the destination having the selected IP address by IPsec communications.

Figure 10:
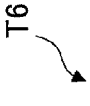
FIG. 10 is a security level setting table.

FIG. 10 is a security level setting table T6. In FIG. 10, security levels, encryption parameters, and combinations of parameters for encrypting data have been registered. The encryption parameters are protocols, encapsulation modes, and request levels. When a user inputs only a security level, parameters can be set by using the table T6 without setting encryption parameters.

FIG. 11 is a fifth IP address range table T7. In FIG. 11, IP addresses which can be allocated to a destination in the IPsec communications have been registered with the security level shown in FIG. 10 by a manager beforehand.

When a user selects one address from the IP address range table T7, the selected address becomes an IP address of a destination. At the same time, IPsec is set corresponding to the selected IP address and the user can transmit data to the destination having the selected IP address by IPsec communications.

Registration by Manager Beforehand

Figure 12:
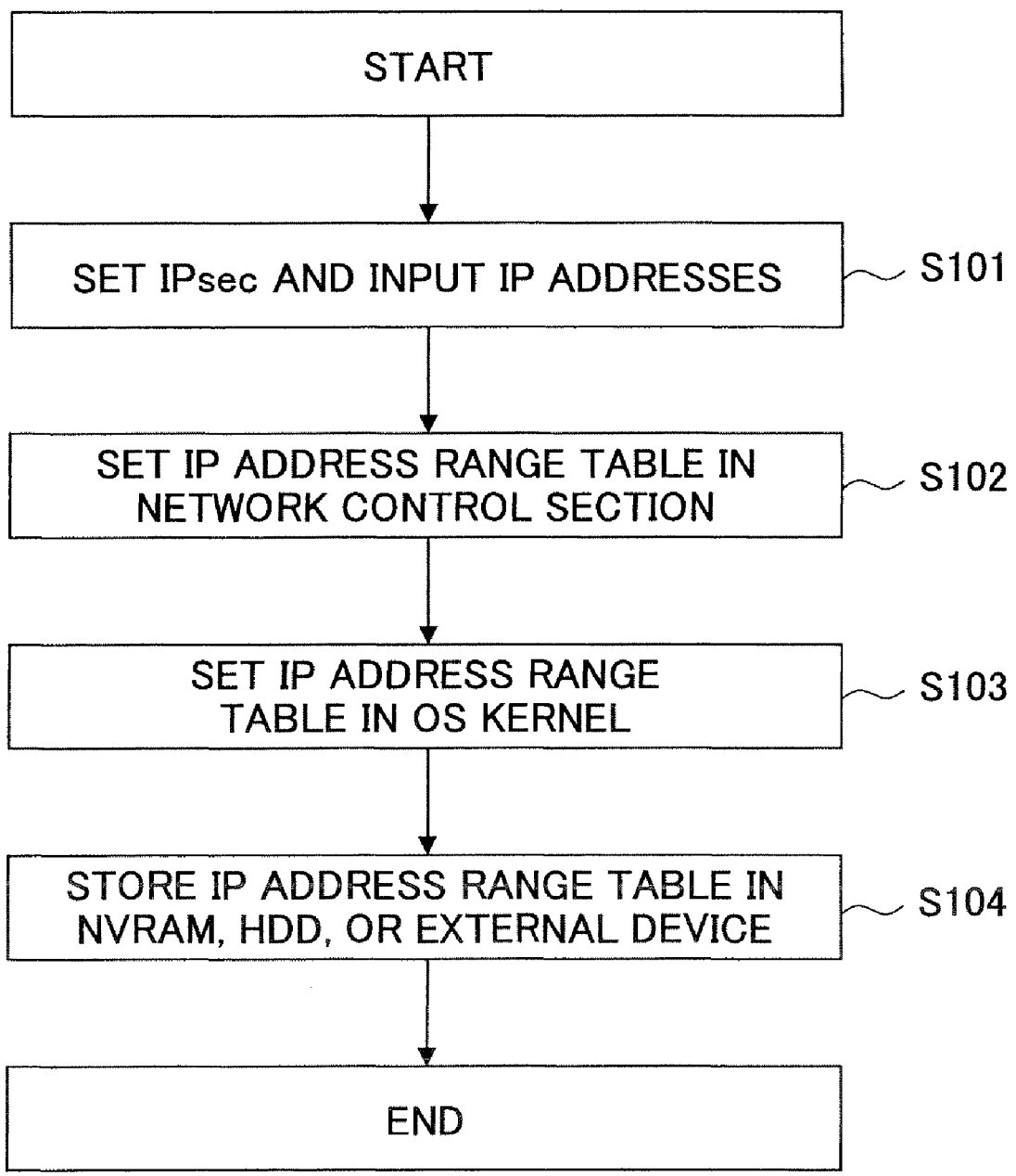
FIG. 12 is a flowchart showing processes to register the tables shown in FIGS. 5 through 11 by a manager beforehand.

FIG. 12 is a flowchart showing processes to register the tables T1 through T7 by a manager beforehand. That is, the tables T1 through T7 are set in the network control section 144 and the OS kernel 147 beforehand.

In FIG. 12, first, IPsec is set in the network apparatus 1 and IP addresses to be allocated to a destination are input by a manager (S101). Next, an IP address range table is set in the network control section 144 in which the IP addresses to be allocated to a destination are set (S102) and also is set in the OS kernel 147 (S103). Then the IP address range tables are stored in the NVRAM 110, the HDD 108, or an external device (S104).

When only data of the IP address range table are stored, the data can potentially not be set in the network control section 144 and in the OS kernel 147. That is, the data can be maintained in the IP address generating section 154 without being stored in the NVRAM 110, the HDD 108, or the external device. Further, the data may be stored in both the external device and the NVRAM 110 or the HDD 108.

Figure 13:
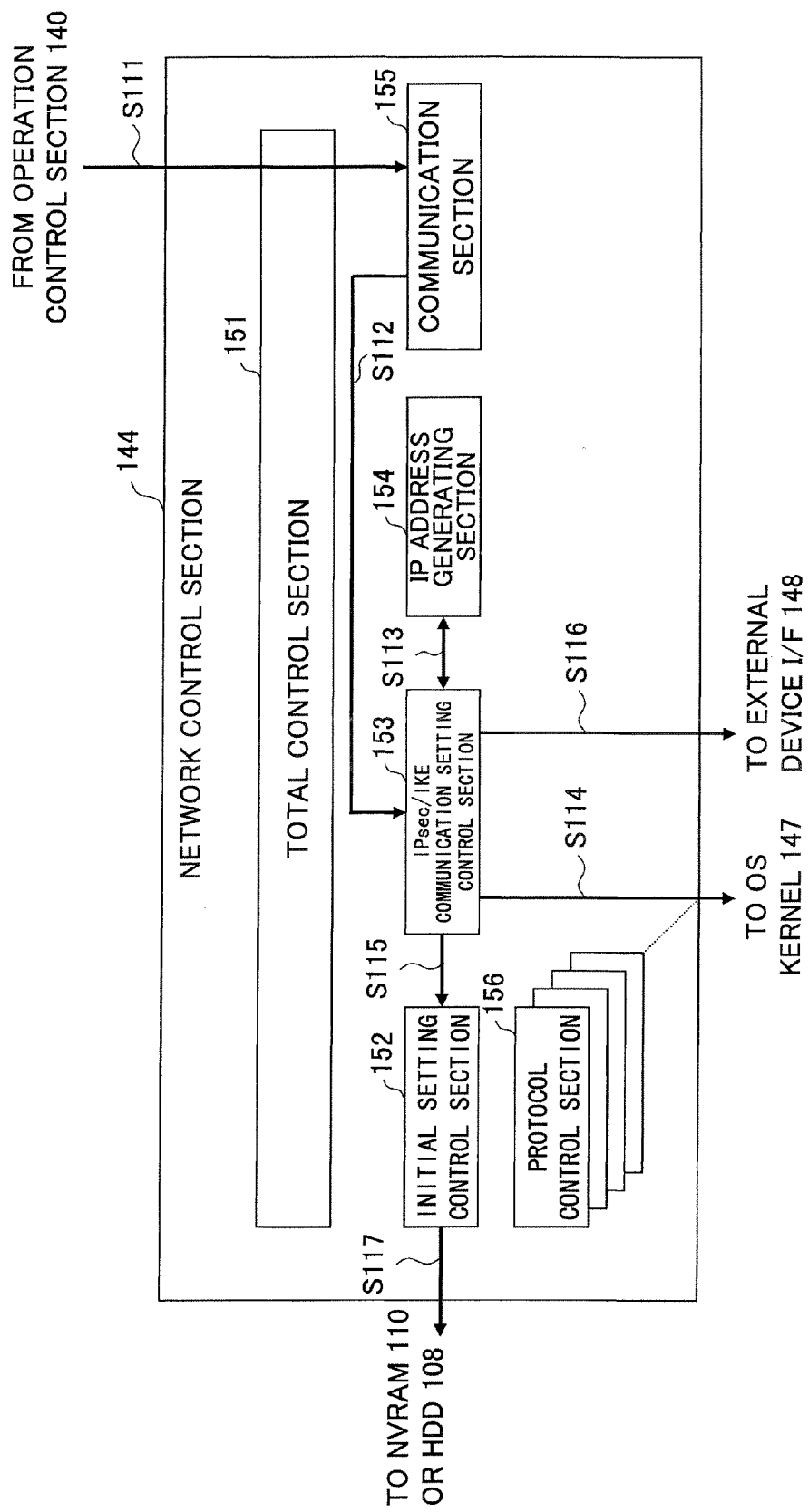
FIG. 13 is a block diagram showing operations in the network control section when the IP address range tables are registered beforehand by the manager.

FIG. 13 is a block diagram showing operations in the network control section 144 when the IP address range tables are registered beforehand by the manager.

In FIG. 13, when the IPsec/IKE communication setting control section 153 receives an IPsec setting and an IP address range from the operation control section 140 via the communication section 155 (S111 and S112), the IPsec/IKE communication setting control section 153 sets the IPsec setting and the IP address range in the IP address generating section 154 (S113) and in the OS kernel 147 (S114). In addition, the IPsec/IKE communication setting control section 153 stores the IPsec setting and the IP address range in the NVRAM 110 or the HDD 108 via the initial setting control section 152 (S115 and S117), or stores the IPsec setting and the IP address range in an external device via the external device I/F 148 (S116).

IPsec Setting by User

Figure 14:
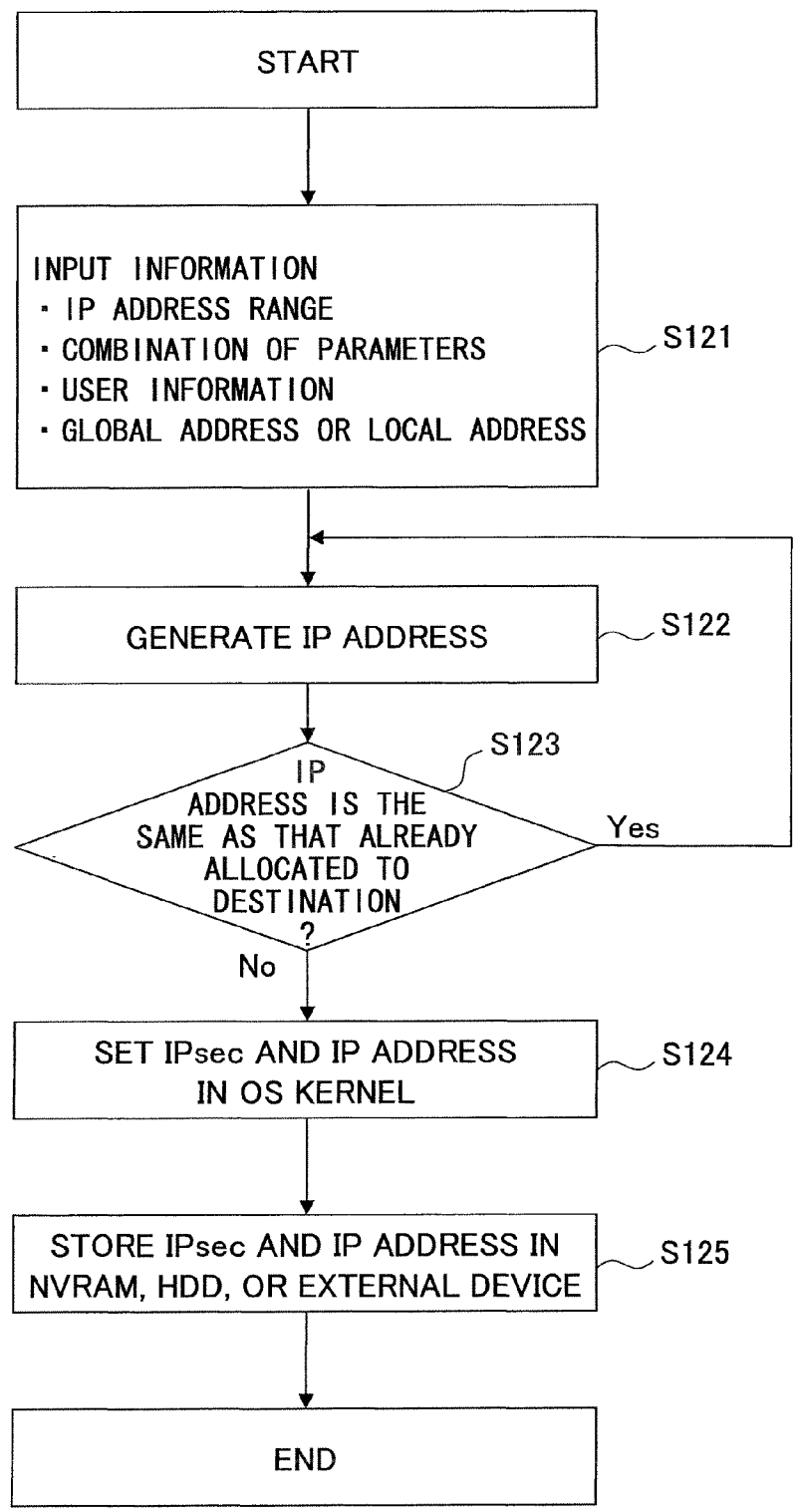
FIG. 14 is a first flowchart showing processes to set IPsec by a user.

FIG. 14 is a first flowchart showing processes to set IPsec by a user. That is, an IP address is generated and determined by inputting encryption parameters and user information. The user information is, for example, a key word.

In FIG. 14, first, a user inputs information (S121). The information is the IP address range selected from the first IP address range table T1 shown in FIG. 5, the combination of parameters selected from the second IP address range table T3 shown in FIG. 7, the combination of parameters and the user information selected from the third IP address range table T4 shown in FIG. 8, and the combination of the parameters and the global address or the local address selected from the fourth IP address range table T5 shown in FIG. 9.

Next, the IP address generating section 154 generates an IP address from the IP address range (S122). For example, the IP address is generated by randomly selecting one address from the IP address range.

Next, it is determined whether the generated IP address is the same as that already allocated to a destination (S123). When the generated IP address is the same as that already allocated to a destination (Yes in S123), the IP address generating section 154 generates another IP address from the IP address range (S122). The above steps are repeated until an IP address is generated.

When the generated IP address is not the same as that already allocated to a destination (No in S123), IPsec and the generated IP address are set in the OS kernel 147 (S124), and are stored in the NVRAM 110, the HDD 108, or the external device (S125).

Figure 15:
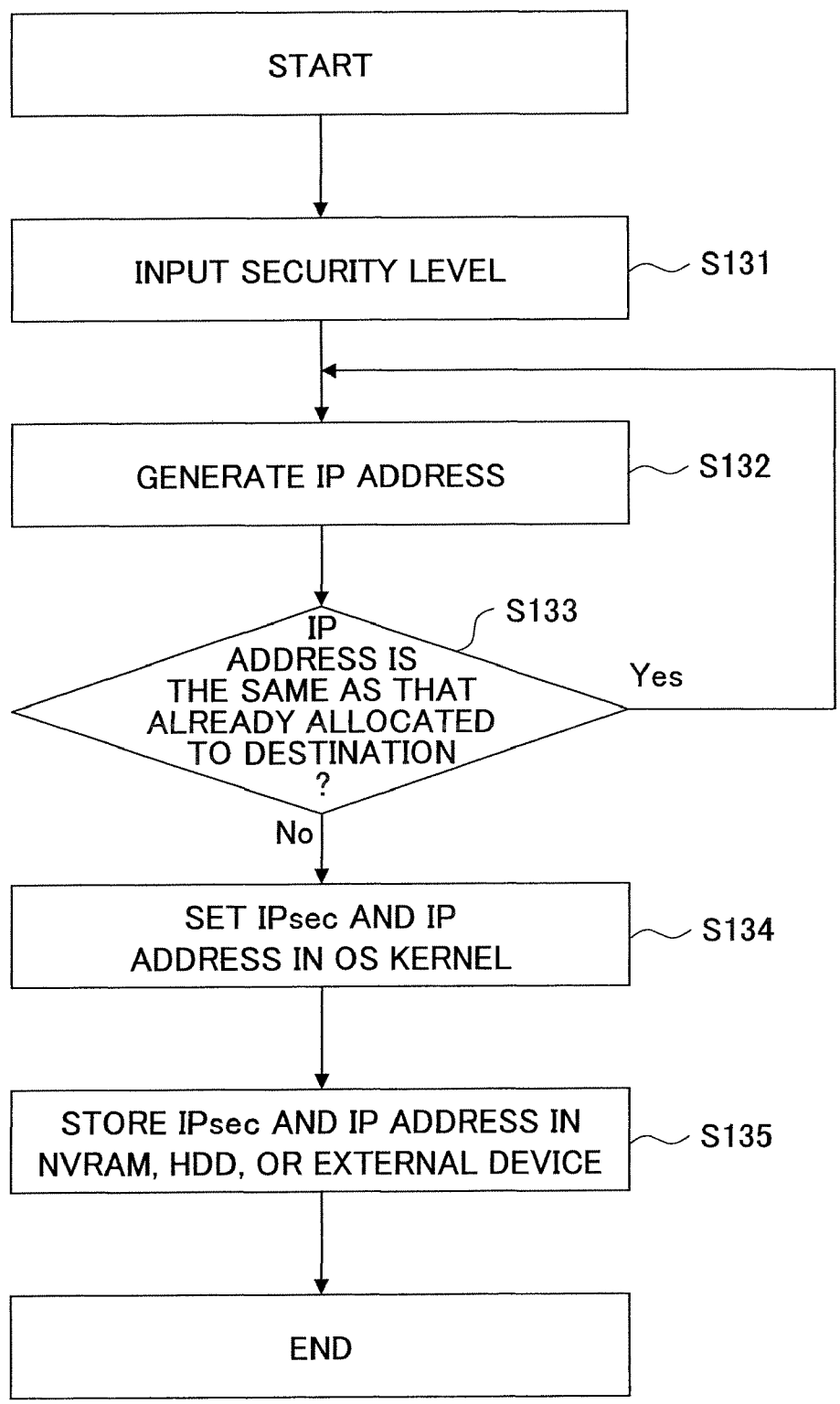
FIG. 15 is a second flowchart showing processes to set IPsec by a user.

FIG. 15 is a second flowchart showing processes to set IPsec by a user. That is, an IP address is generated and determined by inputting a security level instead of inputting parameters for encrypting data and user information.

In FIG. 15, first, a user inputs a security level (S131) The security level is selected from the fifth IP address range table T7 shown in FIG. 11.

Next, the IP address generating section 154 generates an IP address from the IP address range (S132). For example, the IP address is generated by randomly selecting one address from the IP address range.

Next, it is determined whether the generated IP address is the same as that already allocated to a destination (S133). When the generated IP address is the same as that already allocated to a destination (Yes in S133), the IP address generating section 154 generates another IP address from the IP address range (S132). The above steps are repeated until an IP address is generated.

When the generated IP address is not the same as that already allocated to a destination (No in S133), IPsec and the generated IP address are set in the OS kernel 147 (S134), and are stored in the NVRAM 110, the HDD 108, or the external device (S135).

Figure 16:
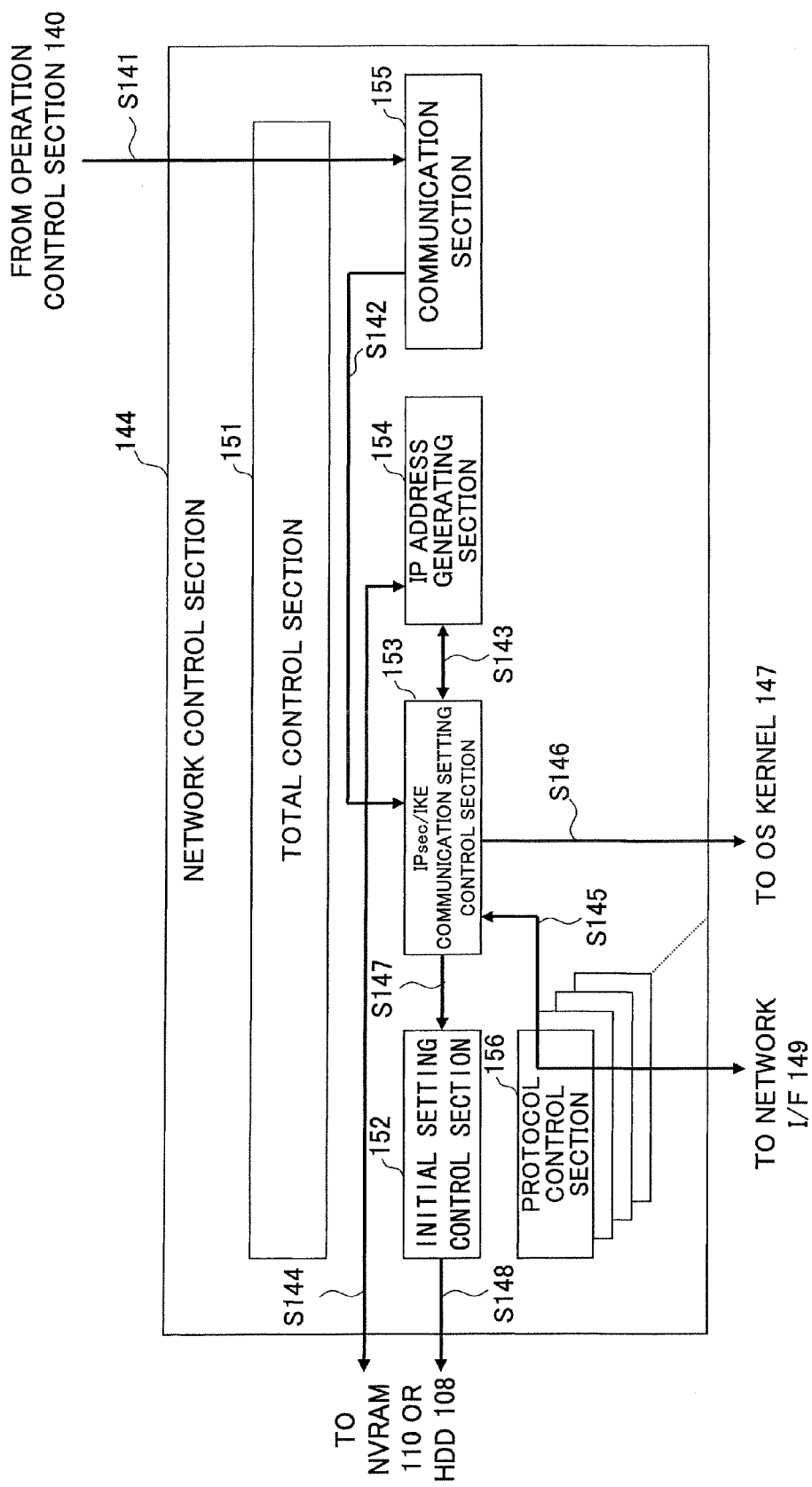
FIG. 16 is a block diagram showing first operations in the network control section when IPsec is set.

FIG. 16 is a block diagram showing first operations in the network control section 144 when IPsec is set. That is, an IP address is determined by the input IPsec setting.

In FIG. 16, when the IPsec/IKE communication setting control section 153 receives a user input from the operation control section 140 via the communication section 155 (S141 and S142), the IPsec/IKE communication setting control section 153 informs the IP address generating section 154 of the user input (S143). In this, the IP address range table has been stored in the NVRAM 110 or the HDD 108. The IP address generating section 154 obtains an IP address from the table in the NVRAM 110 or the HDD 108 (S144). The IPsec/IKE communication setting control section 153 determines whether the IP address obtained by the IP address generating section 154 is the same as that already allocated to a destination via the network I/F 149 (S145).

When the IP address obtained by the IP address generating section 154 is not the same as that already allocated to a destination, the IPsec/IKE communication setting control section 153 sets the IP address in the OS kernel 147 (S146). In addition, the IPsec/IKE communication setting control section 153 sets the IP address in the NVRAM 110 or the HDD 108 via the initial setting control section 152 (S148).

Figure 17:
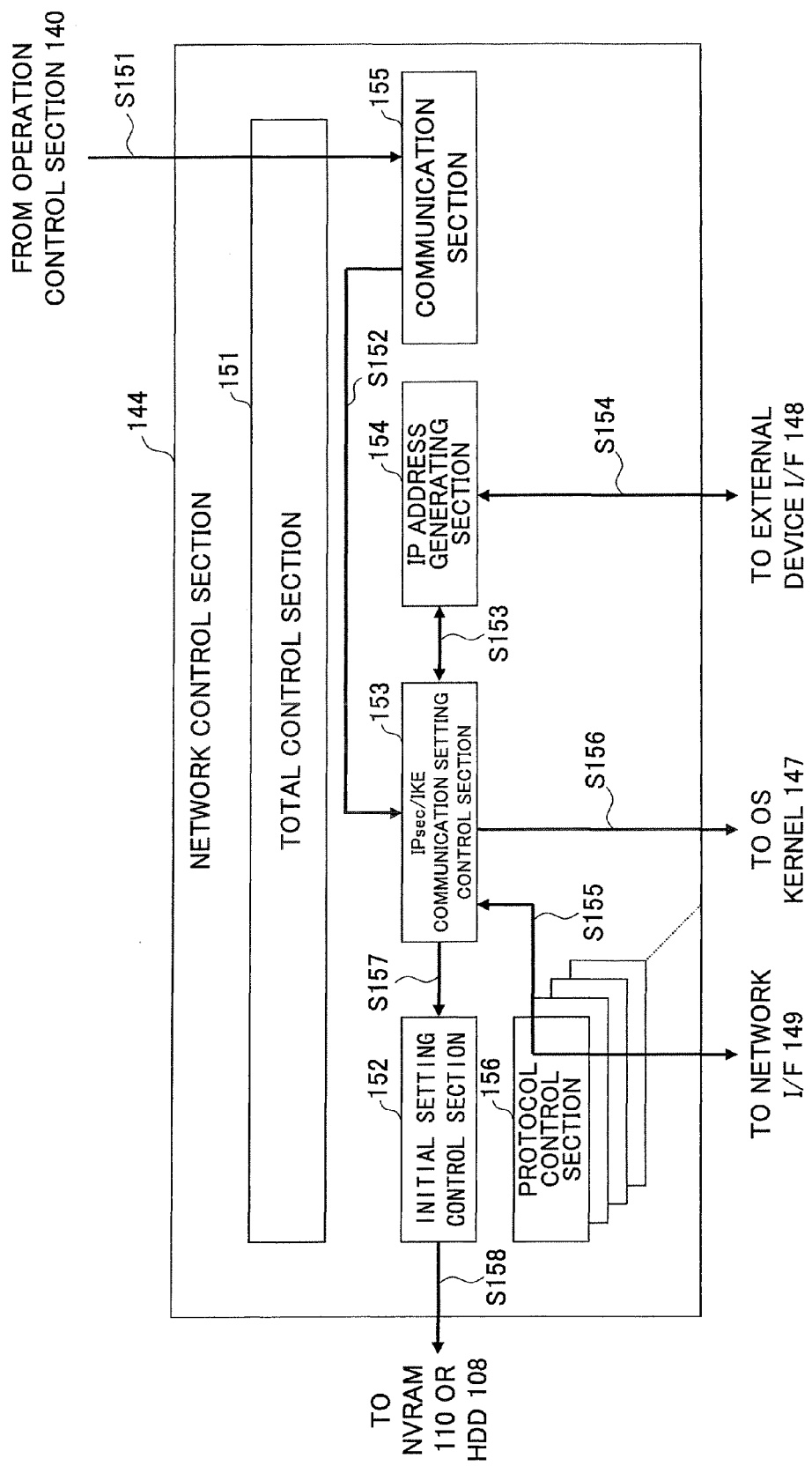
FIG. 17 is a block diagram showing second operations in the network control section when IPsec is set.

FIG. 17 is a block diagram showing second operations in the network control section 144 when IPsec is set. In FIG. 17, an IP address is determined by accessing the external device.

In FIG. 17, when the IPsec/IKE communication setting control section 153 receives a user input from the operation control section 140 via the communication section 155 (S151 and S152), the IPsec/IKE communication setting control section 153 informs the IP address generating section 154 of the user input (S153). In this, the IP address range table has been stored in an external device. The IP address generating section 154 obtains an IP address from the external device via the external device I/F 148 (S154). The IPsec/IKE communication setting control section 153 determines whether the IP address obtained from the external device is the same as that already allocated to a destination via the protocol control section 156 and the network I/F 149 (S155). When the IP address obtained from the external device is not the same as that already allocated to a destination, the IPsec/IKE communication setting control section 153 sets the IP address in the OS kernel 147 (S156). In addition, the IPsec/IKE communication setting control section 153 sets the IP address in the NVRAM 110 or the HDD 108 via the initial setting control section 152 (S157 and S158).

IKE/IPsec Communications

Figure 18:
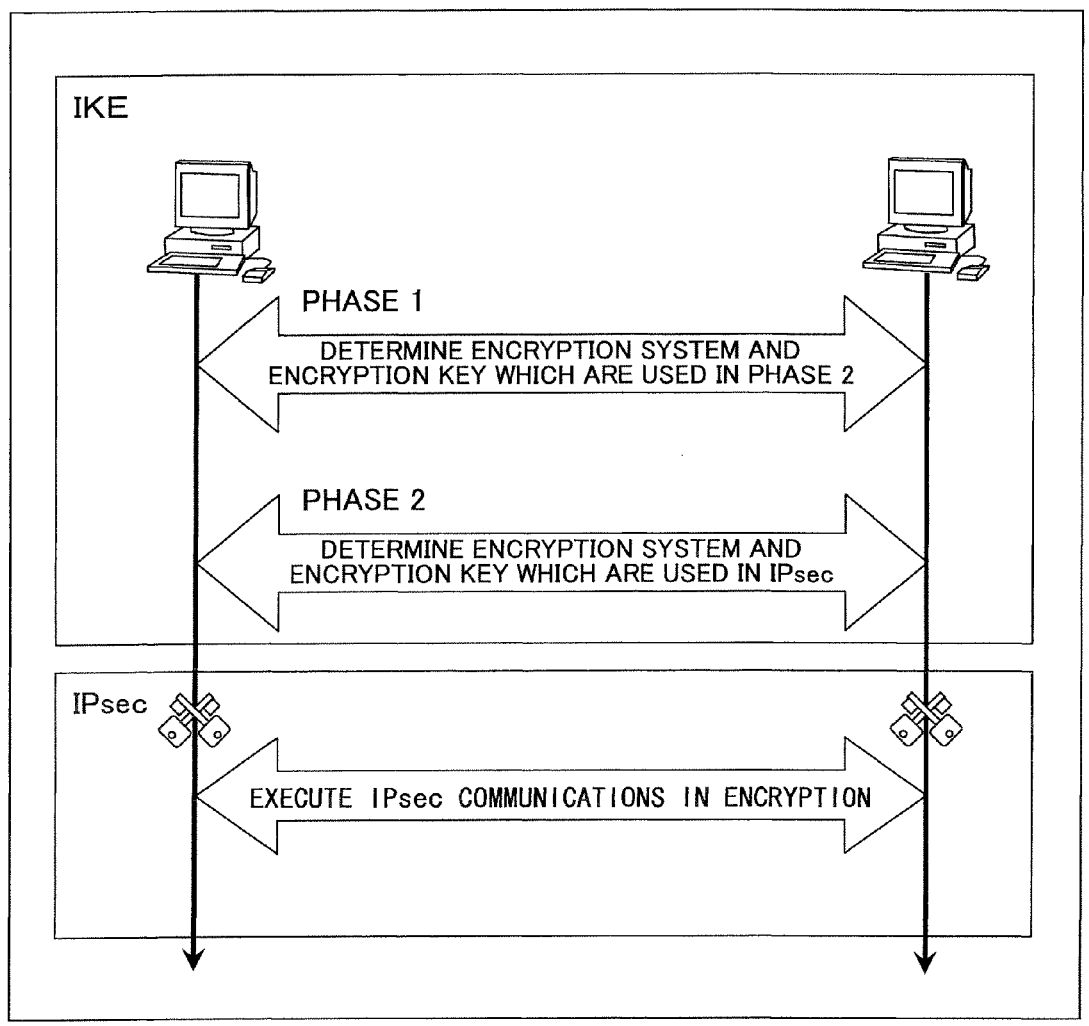
FIG. 18 is a sequence chart showing communications in IKE and IPsec.

FIG. 18 is a sequence chart showing communications in IKE and IPsec. In FIG. 18, a negotiation flow of IKE and an IPsec flow thereafter are shown.

In IKE, in phase 1, an encryption system which is used in phase 2 is determined and an encryption key which is used in phase 2 is generated; in phase 2, an encryption system and an encryption key which are used in IPsec are negotiated. Then encrypted IPsec communications are executed.

As described above, according to the embodiment of the present invention, in order to easily use IPsec, an IP address is automatically generated in a specific IP address range of IPsec communications when IPsec is set.

Consequently, in a network apparatus having an encryption function which apparatus can transmit and receive data via a network such as the Internet and an intranet, an IP address of the network apparatus can be automatically generated by using encryption parameters set by a user. With this, the user can use IPsec without recognizing the IP address.

In addition, since the generated IP address is in a specific IP address range of the IPsec communications, the IPsec communications do not need to be set between the network apparatuses having the same IP address setting system.

In addition, since the generated IP address can be a global address or a local address which is used only in a sub network, the user can separately use the IP address in a different environment.

In addition, when an IP address is generated, the IP address range can be determined by user information other than encryption parameters. Therefore, the user can manage the network apparatuses capable of the IP communications by the user information.

In addition, the user can set an IP address range having encryption parameters by using a security level having a few levels. Therefore, the IPsec communications can be easily set by the user who is not an expert in IPsec communications.

In addition, since data and algorithm parameters for generating an IP address can be stored in an external device attachable to a network apparatus, plural network apparatuses can use the data and the algorithm parameters and can execute the IPsec communications. With this, the network apparatuses can be easily managed, and a PC can be a network apparatus capable of using the IPsec communications.

Further, the present invention is not limited to the specifically disclosed embodiment, and variations and modifications may be made without departing from the scope of the present invention.

The present invention is based on Japanese Priority Patent Application No. 2006-069766, filed on Mar. 14, 2006, with the Japanese Patent Office, the entire contents of which are hereby incorporated herein by reference.

What is claimed is:

1. A network apparatus which is connected to a network, comprising:
   a controller including a CPU and a system memory;
   a managing unit responsive to the controller which manages an address range in which addresses to be allocated to a destination network apparatus are registered and encryption parameters for encrypting data to be transmitted to the destination network apparatus so that the address range and the encryption parameters are related to each other;
   an input unit which receives a user selection of a combination of encryption parameters;
   an address generating unit responsive to the controller which generates an address for the destination network apparatus by selecting an address in the address range, wherein the address in the address range is registered with a combination of the encryption parameters and the address range is determined as the address range corresponding to the user selection of the combination of the encryption parameters; and
   an encryption unit responsive to the controller which encrypts the data to be transmitted to the address generated by the address generating unit based on the encryption parameters, and encrypts the data to be transmitted to the generated address by IPsec,
   wherein the selected address in the address range is registered beforehand with a predetermined security level, and
   the security level is one of at least a high level, a middle level, and a low level, and the security level is registered in association with the encryption parameters such that the encryption parameters, which include a protocol, can be set based on receiving an input of the security level from the user without receiving an input of the protocol from the user.

2. The network apparatus as claimed in claim 1, wherein: the generated address is an IPv6 address or an IPv4 address.

3. The network apparatus as claimed in claim 1, wherein: the addresses in the address range are registered by a user.

4. The network apparatus as claimed in claim 1, wherein: the address in the address range is registered with a combination of the encryption parameters and user information.

5. The network apparatus as claimed in claim 1, wherein: the address in the address range is registered with a combination of the encryption parameters and a global address or a local address.

6. The network apparatus as claimed in claim 1, wherein:
the address range and algorithms for the encryption parameters are stored in an external device attachable to the network apparatus.

7. The network apparatus as claimed in claim 1, wherein the address generating unit generates the address for the destination network apparatus and the encryption unit encrypts the data to be transmitted to the generated address by IPsec without informing the user of the generated address for the destination network apparatus.

8. The network apparatus as claimed in claim 1, wherein the address range is a specific IP address range of IPsec communication and IPsec communication is not setup between the network apparatus and another network apparatus to communicate with which shares a same IP address setting system with the network apparatus.

9. An IPsec setting method in a network apparatus having a CPU and a system memory, which is connected to a network, comprising the steps of:
managing, at the network apparatus, an address range in which addresses to be allocated to a destination network apparatus are registered and encryption parameters for encrypting data to be transmitted to the destination network apparatus so that the address range and the encryption parameters are related to each other;
receiving, at the network apparatus, a user selection of a combination of encryption parameters;
generating, at the network apparatus, an address for the destination network apparatus by selecting an address in the address range, wherein the address range is determined as the address range corresponding to the user selection of the combination of the encryption parameters; and
encrypting, at the network apparatus, the data to be transmitted to the generated address based on the encryption parameters,
wherein the selected address in the address range is registered beforehand with a predetermined security level, and
the security level is one of at least a high level, a middle level, and a low level, and the security level is registered in association with the encryption parameters such that the encryption parameters, which include a protocol, can be set based on receiving an input of the security level from the user without receiving an input of the protocol from the user.

10. The IPsec setting method in the network apparatus as claimed in claim 9, wherein:
the generated address is an IPv6 address or an IPv4 address.

11. The IPsec setting method in the network apparatus as claimed in claim 9, wherein:
the addresses in the address range are registered by a user.

12. The IPsec setting method in the network apparatus as claimed in claim 9, wherein:
the address in the address range is registered with a combination of the encryption parameters and user information.

13. The IPsec setting method in the network apparatus as claimed in claim 9, wherein:
the address in the address range is registered with a combination of the encryption parameters and a global address or a local address.

14. The IPsec setting method in the network apparatus as claimed in claim 9, wherein:
the address range and algorithms for the encryption parameters are stored in an external device attachable to the network apparatus.

15. A non-transitory computer-readable recording medium storing a control program for executing an IPsec setting method, the method comprising:
managing an address range in which addresses to be allocated to a destination network apparatus are registered and encryption parameters for encrypting data to be transmitted to the destination network apparatus so that the address range and the encryption parameters are related to each other;
receiving a user selection of a combination of encryption parameters;
generating an address for the destination network apparatus by selecting an address in the address range, wherein the address range is determined as the address range corresponding to the user selection of the combination of the encryption parameters; and
encrypting the data to be transmitted to the generated address based on the encryption parameters,
wherein the selected address in the address range is registered beforehand with a predetermined security level, and
the security level is one of at least a high level, a middle level, and a low level, and the security level is registered in association with the encryption parameters such that the encryption parameters, which include a protocol, can be set based on receiving an input of the security level from the user without receiving an input of the protocol from the user.

* * * * *